Nov. 11, 1930.  C. E. HOLT  1,781,512
LUBRICATION GUIDE
Filed Nov. 26, 1928  2 Sheets-Sheet 1
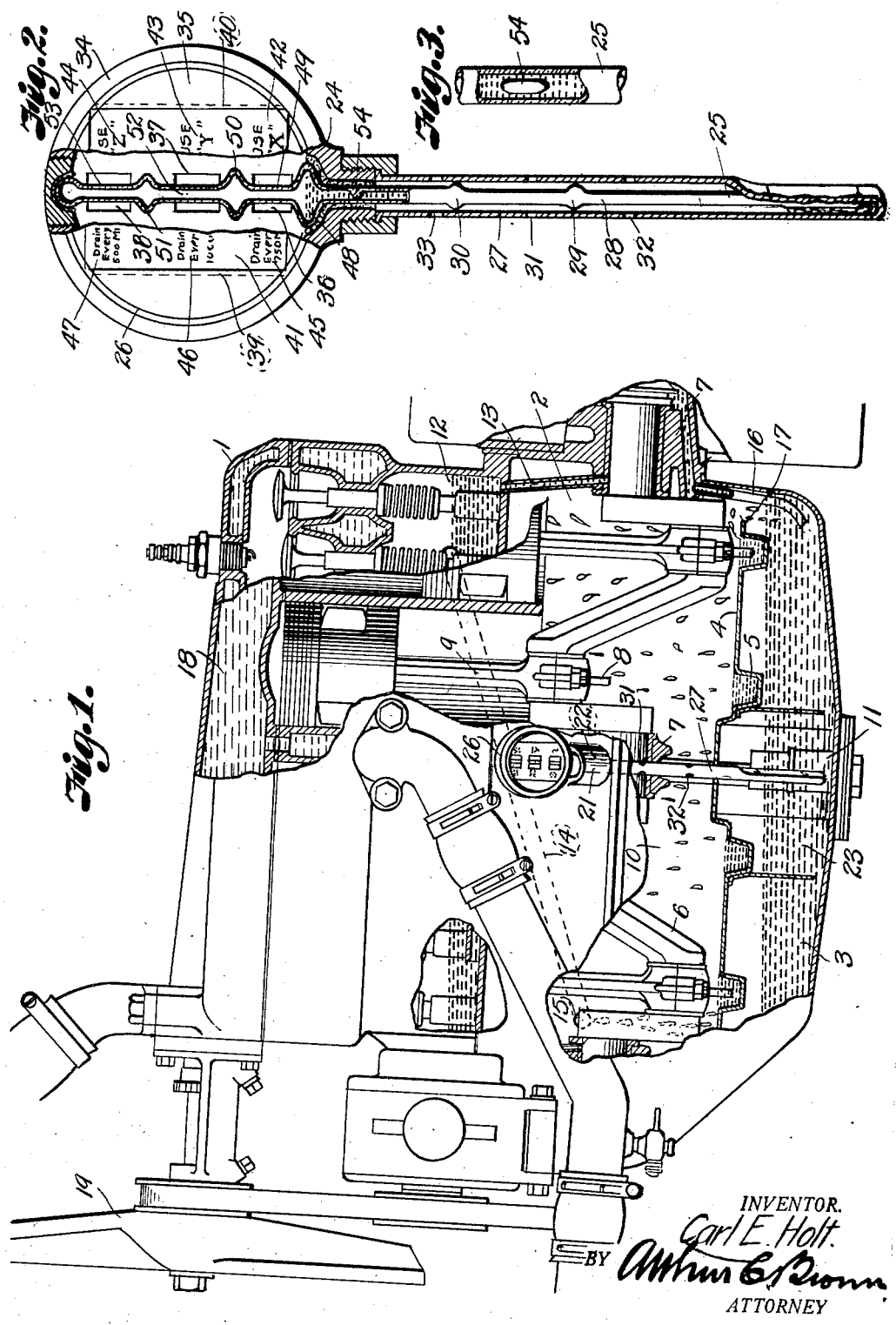
INVENTOR.
Carl E. Holt.
BY Arthur E. Brown
ATTORNEY

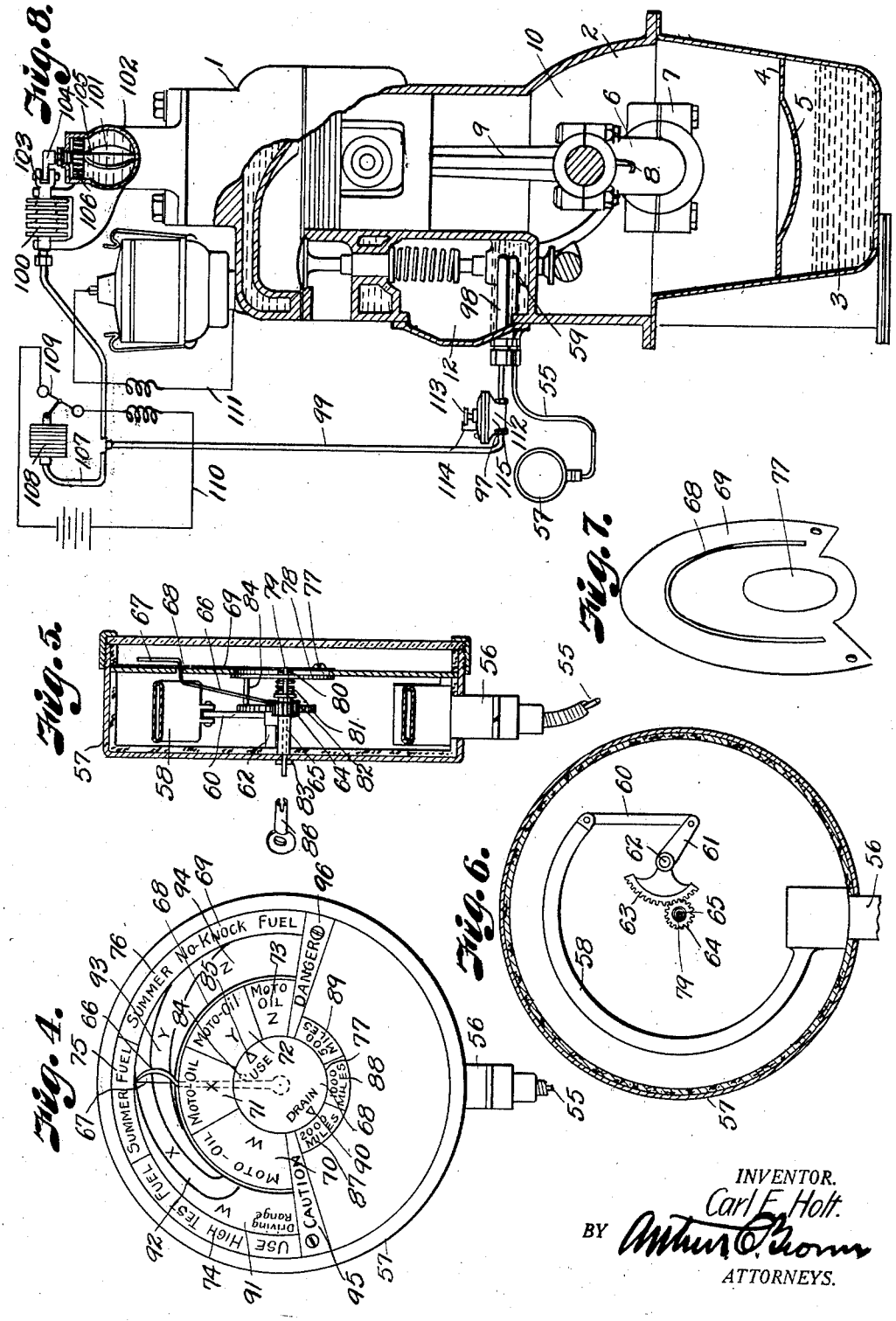

Patented Nov. 11, 1930

1,781,512

UNITED STATES PATENT OFFICE

CARL E. HOLT, OF KANSAS CITY, MISSOURI

LUBRICATION GUIDE

Application filed November 26, 1928. Serial No. 322,052.

My invention relates to lubrication meters and more particularly to methods and means for indicating the character of the suitable lubricant for a particular service condition in an operating machine, and is a continuation in part of my co-pending application, Serial No. 113,785, in which the principles of operation of the invention are set forth.

Lubricants of distinctive character are designated by producers of oils and engines, to meet operating requirements under specific conditions of temperature and work, among the factors that determine the conditions being the character of fuel, the rate of circulation of the cooling medium, and the speed of the engine, the efficiency of the particular lubricant being predicated on the normal operation of the machine and normal condition of mechanism. No means have heretofore been provided for guiding the operator in discovering whether he is operating the machine under the normal conditions for most efficient service of the lubricant with which the machine is supplied; or in selecting a different lubricant to suit changed conditions.

The principal objects of the invention therefore are to inform the operator as to the suitability of the lubricant with which the machine is supplied, and to enable the operator to select and supply a suitable lubricant when the lubricant being used is indicated to be unsuitable, and to adjust operation and demands for lubrication to the lubricant in the machine.

A further object of the invention is to provide temperature responsive means for determining the character of the lubricant to be used in an internal combustion engine, which means is influenced by the changes in temperature of the engine, and a scale co-operating therewith indicating the character of the lubricant to be used in said engine within certain ranges of temperature indicated in response to the effect produced by the engine on the temperature responsive means.

Further objects of the invention are to determine a combined temperature characteristic of a plurality of points in an internal combustion engine, as a step in determining the suitability of the lubricant being used and the character of a required lubricant; to control the indication of a heat effect of one part of an engine by the heat effect of another part, and particularly to determine the combined temperature characteristic by providing temperature-responsive members influenced by temperatures at a plurality of points in the engine, whereby the indication of the response at one point will be modified and controlled by the response at another point.

Further objects of the invention are to control the factors that affect the temperature of the lubricant; for example, to control the cooling medium, and thereby modify the heating of the lubricant by conduction; and to control the fuel supply and ignition, in order to retain the lubricant at a temperature suitable for efficient service in the engine, and prevent operation at excessive temperatures.

It is a further object of the invention to provide a device of the character above mentioned with a plurality of scales, one of which indicates the character of the lubricant to be used and the other of which indicates the length of time that each lubricant shall be used conforming to the characteristics of the scale previously referred to.

In accomplishing these and other objects of the invention, I have provided an improved method, and means for employing the same, preferred forms of which are illustrated in the accompanying drawings, wherein:

Fig. 1 is a view partly in elevation and partly in section of an internal combustion engine, showing my improved lubrication meter associated therewith.

Fig. 2 is an enlarged perspective view of my improved lubrication meter and scale shown partly in elevation and partly in section.

Fig. 3 is a detailed view of a portion of a tube guard and tube illustrating the restriction of the tube to restrain liquid from passing from maximum indicating position until reset by operator.

Fig. 4 is a front elevational view of an indicator dial or face for a modified form of indicator.

Fig. 5 is a vertical central sectional view of the modified form of indicator, a resetting key being shown in spaced relation with the operating shaft.

Fig. 6 is an elevational view of indicator operating mechanism.

Fig. 7 is a detailed perspective view of a removable indicator dial or face for mounting on the indicator.

Fig. 8 is a view partly in side elevation, partly in section and partly diagrammatic of an engine and mechanism responsive to temperature of the lubricant for controlling the cooling medium and actuating elements of an engine for limiting temperatures of engine parts suitably for efficient service of the lubricant with which the engine is supplied, together with a modified form of indicating device, such as shown in Figs. 4 to 7.

Referring in detail to the drawings:

1 designates an internal combustion engine such as used in an automobile, including a crank case 2 having a sump 3, a false bottom or pan 4 provided with splash or dipper troughs 5 and a crank 6 operating on main bearings 7. Dippers 8 on the connecting rods 9 move into and out of the troughs for picking up lubricant and distributing it as a mist or spray through the chamber 10 of the crank case to lubricate the cylinders, pistons, connecting rods, wrist pins and similar parts, the lubricant spray also contacting the walls of the cylinders and absorbing heat from all parts touched.

A pump 11 delivers lubricant from the sump to a valve chamber 12 from which the lubricant passes through channels 13 to parts such as the main bearings 7 and drips from the main bearings to the false bottom. Overflow of an excess of lubricant in the valve chamber is provided for, the excess flowing through a conduit 14 and dripping from an outlet 15 to the false bottom, while relatively small amounts of lubricant that pass outwardly over the rear main bearing drain to the sump through a conduit 16. Overflow from the troughs flows over one end 17 of the false bottom into the sump, the outlet 15 delivering overflow from the valve chamber to the opposite end of the false bottom.

A water jacket 18 surrounds the cylinders and water is circulated when desired and at a desired rate through the jacket and to a radiator not shown, a fan 19 producing a blast that passes through the radiator to cool the water and also passes over the surface of the crank case under the hood.

A lobe or shoulder 21 on the upper half of the crank case in the illustrated type of engine, is provided with an opening 22 into which a bayonet may be inserted for measuring the depth of the body 23 of lubricant, in the sump.

The structure just described comprises an ordinary internal combustion engine representing one type of machine to which the invention may be applied; and for illustrative purposes the invention will be described as adapted for use on such an engine in a preferred form and in its simplest aspect.

My invention comprises a temperature responsive indicating device generally designated 24, and comprising a temperature responsive member 25 which may consist of a glass thermometer containing an expansible element such as mercury; and a scale element or indicating member 26 into which the tube extends, a tubular casing 27 being provided for supporting and protecting the tube, whereby the device may be inserted through the opening 22 for extending the tube into the lower portion of the crank case where the mercury may be influenced by the various temperatures in and around the crank case.

The tube comprises a differentiated lower end portion 28 adapted for positioning in the sump for influence on the mercury by the temperature of lubricant in the sump, a differentiated enlarge portion 29 such has a bulbous member for positioning above the false bottom for influence by the temperatures in the crank case chamber 10, and a further differentiated portion or bulbous member 30 designed to stand in the opening 22 for influence by the temperature of the walls of the case. Upper and lower openings 31 and 32 are distributed in the guard adjacent the portion 29, both above and below the same for admitting spray and heat from the crank case to said portion 29 and openings 33 are similarly distributed in the guard adjacent the portion 30 so that the temperature of the case walls may freely influence the mercury at that point.

The guard may be closed at its lower end, and material, for example lubricant passing downwardly over the tube within the guard, may fill the space between the tube and guard wall to conduct heat from the lubricant and guard to the tube and mercury. Lubricant tends to circulate through the openings 31 and 32 over the adjacent portion of the tube, entering at one group of openings and leaving at the other group.

The indicator member preferably comprises a casing 34 and a front cover 35 having a plurality of vertically aligned openings 36, 37 and 38 through which the upper level or indicating position of the mercury may be observed and through which air driven by the fan may pass, the case having parallel vertical guide grooves 39 and 40 to receive a removable and replaceable chart 41 having symbols and indicia 42 to 47 inclusive, later described, for informing of the significance of the indications of the column of mercury.

The tube is further provided with an enlargement 48 within the indicator casing and below the lower sight opening 36 to provide for a relatively large body of the mercury at that point and thereby limit the movement of the mercury so that the adjacent normal portion 49 of the tube which is visible through the opening may be relatively short and yet suffice for disclosing a relatively wide range of responses of the mercury to temperature.

Similar enlargements 50 and 51 are provided in the tube below the portions 52 and 53 thereof that are visible through the sight openings 37 and 38, for similar purposes. The enlargements 48, 50 and 51 also provide for a relatively large body of the expansible element adjacent the openings to be influenced by the temperature of the air drawn over the crank case by the fan whereby the responses of the mercury to changes in temperature of the lubricant are modified by air temperatures.

The removable chart plate 41 originally provided has instructions represented by the indicia 42 to 47 adapted for guiding the operator in adjusting his engine speed, fuel, and water supply, to the character of lubricant with which the engine is initially supplied, and also guiding the operator in the selection of a lubricant suitable for performing efficiently under conditions different from those for which the originally supplied lubricant was intended. The instructions may pertain to an extent of use, for example, the number of miles over which an automobile may run before the lubricant should be drained from the crank case, and to the kinds and types of oil which should be substituted for the oil in the crank case.

A restriction 54 is provided in the tube adjacent the indicator whereby the mercury is permitted to move freely upwardly for indicating the net temperature of a plurality of factors in the engine but will be restrained from return downwardly in the tube upon cooling, so that the maximum temperature obtained over any selected period will be indicated by the restrained mercury. When the maximum reading is observed at the suitable time, for example by an inspector at the end of a work day, the restrained mercury may be returned to the lower end of the tube in the well known manner.

The instructions will vary according to the type of oil provided for normal operation of the machine so that the operator may observe at any time whether or not he is operating the machine in such a manner that the lubricant will serve efficiently.

The modified form of indicator illustrated in Fig. 4 may include a Bourdon tube, in which case the upper end of a tube 55 containing an expansible fluid is connected into a collar 56 on which a circular housing 57 is mounted, and a curved resilient flat tube 58 of the Bourdon type arranged in the casing is connected to the tube 55 and tends to expand or straighten under pressure of the fluid in the tube as affected by temperature of the area to which a portion of the tube 55, such as the opposite end 59 may be exposed.

Pivotally connected to the outer end of the curved resilient member 58 is a link 60 pivotally connected to the outer end of a crank 61 pivotally mounted on a pin 62 supported by the housing, the inner end of the crank comprising a gear segment 63 meshed with a gear 64 on a hollow shaft 65 fixed to the housing and which may be formed integrally with the back of the housing.

An indicating finger 66 keyed to the gear 64 has an offset pointer 67 extending through a circularly disposed slot 68 in a removable dial plate or face member 69 adapted for mounting on the housing and provided with a circularly disposed series of sections provided with indicia 70, 71, 72 and 73 indicating grades of lubricating oil, and a similar circularly disposed series of instructions 74, 75, and 76 indicating types of fuel.

The indicia 70 to 73 designate the areas to which the movement of the finger should be limited to indicate that the temperatures in the engine are being maintained at the proper degrees for most efficient and safe operation of the engine, when the engine is supplied with the prescribed lubricant, the dial plate being provided for using such lubricant under particular conditions. The indicia 74, 75 and 76 are related to the indicia 70 to 73, and designate ranges for most efficient fuels for use when the operating temperature is within the efficient range of the prescribed lubricant over the period of time indicated by indicia 87, 88 and 89.

The dial plate is provided with a circular opening 77 coaxial with the housing, and a disk 78 having slightly larger diameter than that of the opening is mounted on the outer end of a shaft 79 extending through the hollow shaft 65, and retained by a transverse pin 80. A coil spring 81 bearing against a washer 82 positioned on the end of the hollow shaft bears against the disk 78 to urge the shaft 79 outwardly and frictionally engage a transverse pin 83 in the opposite end of the shaft with the outer surface of the housing. A leg 84 eccentrically mounted on the inner face of the disk is engageable by the finger for shifting the disk rotatively and positioning a pointer 85 on the outer face of the disk in relation to one of the indicating sections on the dial plate, the disk remaining in its new position when the finger returns upon reduction of temperatures, so that the pointer may indicate the maximum net temperature attained during operation over a selected period.

The transverse pin 83 in the outer end of the shaft 79 also provides a ward for engagement by a key 86 whereby the disk may be manually returned to retracted position after its indication of maximum temperature has been noted and recorded.

In some engines, for example high compression engines, it may be advisable to use so-called no-knock fuels at all times, however, varying the volatility and viscosity of this type of fuel for various operative conditions is desirable and economical as well as having an influence on the period of time an oil can be used in an engine that is not properly equipped to remove the dilution from the engine crankcase.

A section on the dial plate 69 is provided with a series of indicia 87, 88, and 89, representing extent of travel, and a second pointer or arrow 90 may be installed on the disk opposite to the first named pointer and adapted to point to the indicia 87, 88 and 89, for example to designate the number of miles which may be safely covered without changing the lubricant, when the prescribed lubricant for which the chart is provided, is being used.

The dial plate is further provided with a circularly disposed series of indicia 91, 92, 93 and 94, corresponding to the indicia over which the pointer portion of the finger moves; and with warning symbols 95 and 96 at each end of the arc in which the finger moves, whereby the finger, and the pointer 85 on the disk, may indicate and the engine is being or has been operated in such a manner as to produce temperatures under which the lubricant and the engine may suffer damage.

While I have illustrated and described a heat responsive element having differentiated portions adapted to receive the influences at different positions in a machine, I may obtain the net heat effect on the temperature responsive element by positioning a temperature responsive member in the lubricant at a position where the temperature is an average of temperatures at a plurality of points, for example in the sump, where the lubricant overflowing from the false bottom has an opportunity to cool before being pumped into the valve chamber and also is influenced by the temperature of the road over which the machine is passing and by atmospheric temperature, or in the valve chamber, where the temperature of the lubricant is substantially that of the sump but modified by the temperature of the valve chamber.

I illustrate in Fig. 8 an installation in which temperature responsive members comprise tubes containing an expansible fluid and extending into the valve chamber, a device such as that illustrated in Fig. 4 being identified by the same numerals in Fig. 8, and a controlled device generally designated 97 including also a tube 98 extending into the valve chamber and having a branch 99 on its outer end communicating with a bellows 100 whereby expansion of fluid in the tube may effect operation of a valve 101 positioned in the water line 102 to the jacket, the connection comprising a yoke 103 operated by the bellows and a lever 104 for operating the valve shaft 105.

The valve is assumed to be normally closed to limit circulation of water until the temperature of the lubricating oil, representing temperatures produced by the combustion of fuel and operation of the engine, has increased to a suitable degree for most efficient service by the lubricant; and in my structure the valve is adapted to be automatically operated to delay heating of lubricant and also to effect cooling of the cylinders to prevent overheating of the lubricant.

Should only a small amount of water be present in the jacket when the engine is put into operation, steam may be generated having high pressure and temperature, and rendering it desirable that the valve be opened before the lubricant has attained its operating temperature. I therefore provide a thermostatic element 106 in the valve responsive to the temperature in the jacket for opening the valve independently of the bellows, comprising a coil having one end fixed to the shaft 105 and the other end to the valve 101, the thermostatic coil 106 operating the valve at varying temperatures due to the action of the bellows accelerating or retarding the action of the thermostatic coil 106.

A second branch 107 from the tube conducts the expansible fluid into a bellows 108 adapted to operate a switch 109 in a circuit 110 connected to the ignition circuit 111 of the engine whereby excessive pressure consequent upon the increase of temperature of the expansible element beyond a predetermined degree may operate the switch to break the circuit and suspend ignition for stopping the machine.

An indicating control valve 112 connected into the tube 98 comprises a diaphragm valve having a diaphragm adjusting screw 113 provided with a scale, and a stationary pointer 114, for indicating the adjustment of the diaphragm to increase or decrease the size of the lower chamber 115 communicating with the tube.

The screw may be rotated to enlarge the chamber and provide a larger space into which the fluid may expand for delaying action of the expanding fluid on the bellows so that a lubricant adapted for use at high temperature may not cause actuation of the bellows until the desired high temperature is attained.

The utility of the invention and its novelty may be recognized by reference to a few commonly disregarded or heretofore unrecognized relations of temperatures at different points in an internal combustion engine.

Combustion chamber temperatures of internal combustion engines vary in almost direct ratio to load conditions while water jacket temperatures may remain constant. By a test with a well known four cylinder engine with the cooling water constant at 120° F. it was found that:

Developing 22 B. H. P. at 400 R. P. M. combustion chamber temp. 750° F.
Developing 27 B. H. P. at 600 R. P. M. combustion chamber temp. 850° F.
Developing 32 B. H. P. at 800 R. P. M. combustion chamber temp. 950° F.
Developing 40 B. H. P. at 1200 R. P. M. combustion chamber temp. 1100° F.
Developing 45 B. H. P. at 1600 R. P. M. combustion chamber temp. 1200° F.

These temperatures, variously modified, are transmitted by conduction to the parts of an engine that must be lubricated.

The lubricant used will further modify the heat in ratio to the rate of circulation, area exposed for radiating absorbed heat, condition of the surface through which the heat is radiated, and the temperatures of the external medium which absorb the heat.

Temperature responsive means placed in the lubricant in circulation within such an engine will indicate an average of all of the above mentioned temperatures, which will furnish indicia to the service, or work, the engine is performing.

Since one skilled in the art can determine the preferred character and body of a lubricant to be used in such an engine for performing various degrees of work, within the range of the engine, the indications can be adapted to indicate grades, character and body of lubricants best suited to render efficient lubrication.

To illustrate: It has been found that a heat indicator placed as specified in the foregoing type of engine will record temperatures, depending upon the season of the year and the work being performed, from 80° F. to 229° F. The lubricant best suited for this engine with indications up to 125° F. is a free flowing, free burning oil of approximately 45–47" Say. viscosity at 210° F. Indications up to 150° F. can best be taken care of by a free burning oil of approximately 58–60" Say. viscosity at 210° F. Indications up to 180° F. can best be taken care of by a heat resisting oil of approximately 74–76" Say. viscosity. Indications up to 229° F. can best be taken care of by a heat resisting oil of approximately 96–98" Say. viscosity at 210° F.

With the heat indicator placed in this type of engine it is found that when the lubricant is used at a temperature indication at which it would have a Say. viscosity of less than 48" the danger point is fast approaching. Temperature may be regulated by adjustment of the cooling medium to keep within the above stated temperature indications for the grades of oil specified. When regulating the fuel supply of an engine, which limits the work it can do, the fuel supply would be reduced gradually from an indication in advance of the 48" viscosity point, until at this point the fuel supply would be almost or wholly shut off, and the ignition of the engine would then be interrupted when the indication showed that the viscosity had dropped below the 48" or thereabout.

Engines run hot or cool according to the kind of work they are doing and the way they are designed. The amount of lubrication protection an engine will require will also vary depending upon size, speed and class of work, facts known to those skilled in the art who would take them into consideration in interpreting the temperature indications as taken in applying the invention.

The adjustments would also be reconciled with oil dilution and dirt in the engine air supply problems. Grades may be altered at known indications to assist in balancing the same; it being known that a heavy lubrication film is less affected than a light one.

A particular application of the invention will now be described:

An indicator element is provided having indicia corresponding to the lubricant prescribed for the particular engine and the conditions under which the engine will operate. For example, in case of an automobile engine to operate in summer at moderate speed and under an average load, using a so-called summer fuel, a grade "X" of lubricating oil may be prescribed, which is adapted for most efficient service within a specified range of temperatures. The dial plate will be adapted for causing the heat responsive element to indicate portions of the scale in the range or section designated "X" when the engine is being operated under the conditions for maintaining the lubricant within such specified range.

The operator may observe the indicator and if the indicating portion of the heat responsive element moves into the section designated "Y", he is thus informed that some factor is causing excessive heating of the lubricant. Operations are then adjusted to prevent damage to the lubricant and the engine, such as regulation of the cooling medium and the fuel supply, control of ignition, and similar steps.

Should the indicator indicate that the temperature of the lubricant is being maintained substantially below the range prescribed for "X" oil, the operator is informed of this fact, and also that the conditions require the use of "W" oil.

In each case, the operator is informed that a different fuel should be used for the service demanded of the engine and the type of fuel is indicated, for example, "no-knock" fuel in the case of excessive temperature, and "high test" fuel in the case of deficient temperature.

The inspector who examines the indicator at the end of a run, will observe the maximum temperature recorded by the device, for example observing that the maximum indication was in the range for "Y" lubricant. He will then make suitable adjustments, such as instructions to the operator, changing the lubricant, limiting the speed of the vehicle, substituting an efficient fuel, and making repairs and alterations in the mechanism.

The indicator further informs the operator and the inspector as to drainage periods for a prescribed lubricant used under normal or abnormal conditions for such lubricant. The second pointer on the maximum temperature disk will indicate the normal drainage period on the dial section having the indicia therefor, when the first pointer indicates the type of lubricant, for example "X", with which the engine is supplied. Should the first pointer indicate another lubricant, for example "W", the observer is informed that the drainage period should be altered and in this case reduced.

The removable dial plate, in either of the illustrated forms of the device, is preferably adapted to the lubricant supplied to the engine, a plate having the suitable scale indicia preferably being installed when the lubricant is changed, the substituted plate having indicated drainage periods suitable to the substituted lubricant. The lubricant provided is preferably designated by the intermediate indicia of a series, so that the indicator may inform the observer as to preferred types of lubricants for use when the temperatures are excessive or deficient.

The use of the device further includes the automatic adjustment of operations affecting the temperature of the lubricant, for example, adjustments provided for by structure illustrated in Fig. 8, whereby the expansion of the temperature responsive element, for example the contents of the tube, may control the circulation of cooling water through the jacket for permitting the operating elements to heat the lubricant to a desired temperature, and may also control the ignition to suspend operation when the lubricant is heated excessively and reflects a dangerous condition.

My provisions for influence on the indicator by temperatures at a plurality of points, further safeguards operation of the engine, since the development of an excessive temperature at any of several points will be reflected by the indicator. The overheating of a single bearing in the engine would not indicate requirement of a change of lubricant, being usually due to stoppage of lubricant from the bearing, and such overheating is not ordinarily registered by the device. However, if all bearing surfaces become heated to the extent that the lubricant is thinned sufficiently to permit metal to metal contact, the moving lubricant is correspondingly heated, and actuates the indicator to warn of a dangerous condition.

Excessive road temperatures affect the body of lubricant in the sump. Excessive atmospheric temperatures affect both the sump and the indicating portion of the heat responsive element, the former influences being exerted on the lubricant to modify its temperature, and the latter influence being exerted on the temperature responsive element to modify its indication.

While I have suggested for simplicity in the description that specific types of lubricating oils may be supplied to meet specific conditions, the adjustment of the lubricant to the demands of engine service may be accomplished by blending oils, to reduce or increase the viscosity or similarly alter the character of a lubricant originally designated. The movement of the indicating portion of the temperature responsive element over a section of the scale, indicates the approach of lubricant temperature to a condition requiring another type of lubricant, and fine gradations of lubricant character to engine operating conditions are therefore possible by the use of my device.

What I claim and desire to secure by Letters Patent is:

1. A temperature indicator applied to a machine having a plurality of heat-emitting elements, comprising a stem containing a heat responsive fluid and having a plurality of bulbous portions, each positioned in relation with a selected heat-emitting element, and means combining the responses of said responsive fluid to produce a composite result.

2. A lubricant meter comprising a temperature-responsive member, a scale provided with indicia representing types of lubricant and a series of indicia representing types of fuel, and pointer actuatable by the temperature-responsive member for indicating the type of fuel suitable for use under the temperature conditions whereby the member is influenced.

3. A method of ascertaining lubrication requirements of a machine, including arranging a temperature indicator to receive different heat effects at a plurality of locations in a machine, and disclosing the character of lubricant adapted to meet the requirements indicated by the net heat effect.

4. A method of disclosing lubrication requirements in an operating machine comprising controlling heat indications conformably to the differences in the body and character of lubricants adapted for use in the machine under different temperature conditions in the machine, and indicating the different types of lubricants adapted to meet the different indicated temperature conditions.

5. The method of disclosing lubricating requirements of a machine, comprising arranging a temperature indicator to receive the heat effects of an area in the machine, indicating the useful ranges of particular lubricants for particular services in the machine, and distributing the indicator to indicate varying heat effects over predetermined varying spaces corresponding to the useful ranges of the particular lubricants.

6. A method of ascertaining lubrication requirements of a machine, comprising arranging a temperature-responsive element to receive heat effects at a plurality of locations in a machine and to disclose a net heat effect designating lubricants to meet normal and abnormal requirements of the machine, and arranging indicia conforming to net heat effects whereby the disclosure of a net heat effect may be caused to indicate normal or abnormal lubrication requirements of the machine.

7. A method of indicating the condition of the lubricant in an operating machine comprising arranging temperature-responsive means in the machine to receive a combined effect of temperatures at a plurality of points therein, arranging a scale in association with said means, designating one element of the scale to indicate normal condition for a selected lubricant under selected operating conditions in the machine, ascertaining the body and character of the lubricant which will best meet the lubrication requirements of the machine under said selected conditions, and designating another element of the scale to indicate an abnormal condition, whereby the use of said lubricant will result in the indication of said normal condition element of the scale by the temperature-responsive means when the machine is operating under the selecting condition and the indication of the abnormal condition element when the machine is operating under said abnormal condition.

8. A method of disclosing lubricant requirements of a machine under different operating conditions comprising arranging the temperature indicator in heat responsive relation to a plurality of heatable areas of the machine, arranging a scale in association with said indicator, designating one element of the scale to represent normal lubrication requirements, ascertaining the body and character of the lubricant which best meets different lubrication requirements, and designating other elements on the scale to indicate the body and character of lubricants which will best satisfy the lubrication requirements of the machine when the indications of the indicator warn that the machine is operating abnormally.

9. A method of disclosing lubrication requirements of a machine under different operating conditions comprising arranging a temperature indicator with heat responsive parts related to a lubricant chamber of the machine, arranging a scale in association with said indicator, designating one element of the scale to represent normal lubrication requirements, identifying the lubricant having a body and character which best meets the requirement whereby the use of said identified lubricant will result in the indicator indicating said normal requirement designation when the machine is operating normally, and designating other elements of the scale to indicate respective lubricants having bodies and characters which will best satisfy the lubrication requirements of the machine conformably to indications of the indicator when the machine is operating at less than or above normal.

10. The method of disclosing lubrication requirements of an internal combustion engine comprising initially selecting a lubricant suitable for the engine under normal operating conditions, designating the normal temperature of the suitable lubricant under normal operating conditions, arranging an indicator for indicating the actual temperatures produced by operation, and arranging a scale in association with said indicator for indicating the type of lubricant suitable for use under said indicated actual temperatures.

11. The method of disclosing fuel requirements of an internal combustion engine, comprising initially selecting a lubricant suitable for the normal operation of the engine, designating the normal temperature of the lubricant under operating conditions, indicating the actual temperatures produced by operation, and indicating the type of fuel suitable for use under said indicated actual temperature conditions.

12. A lubrication guide for determining suitable lubricants for a machine under different operating conditions, comprising temperature responsive means influenced by the fluctuations in temperature at a plurality of points in the machine, means for disclosing the response of said temperature responsive means, and a scale associated with said disclosing means, said scale being provided with designations of lubricants suitable for operating conditions indicated by said disclosing means.

13. A lubrication guide for determining the type of lubricant suitable for an operating condition in a machine, comprising temperature responsive means for disclosing fluctuations in temperature in the machine under various operating conditions, and a scale provided with a plurality of indicia representing respectively the types of lubricants suitable for the various operating conditions disclosed by said temperature responsive means.

14. A lubrication guide comprising a scale provided with indicia representing types of lubricants suitable for use under various temperature conditions in a machine, a temperature responsive member adapted to disclose the temperature conditions in the machine, and means enabling the member to identify the type of lubricant suitable for use under the disclosed machine condition having the highest temperature.

15. A lubrication guide comprising a temperature responsive member adapted to disclose fluctuations in temperature in a machine, a scale provided with a series of indicia representing types of lubricants, and means enabling said member to record a maximum temperature in the machine, said enabling means being adapted to identify the type of lubricant suitable for use under said maximum temperature condition in the machine.

16. A lubrication guide comprising a temperature responsive member provided with means for registering maximum temperature responses of said member, and a scale provided with indicia representing types of lubricants suitable for use under the temperature conditions whereby maximum registrations are effected.

17. A lubrication guide comprising a temperature responsive member, a scale provided with indicia representing types of lubricants, and a pointer actuatable by the temperature-responsive member for indicating the type of lubricant suitable for use under a temperature condition whereby the member is influenced.

18. A lubrication guide comprising a temperature responsive member responsive to fluctuations in temperature in a machine, a scale provided with a series of indicia representing types of lubricants and means enabling said member to disclose said temperature fluctuations and a maximum temperature in the machine, said enabling means being adapted to identify on said scale the type of lubricant suitable for use under the temperature conditions in the machine.

19. A lubrication guide comprising a temperature responsive member adapted to disclose fluctuations in temperature in a machine and a maximum temperature, and a scale provided with series of indicia representing respectively types of lubricants and oil drain periods, said enabling means being adapted to identify the type of lubricant and drain period on said scale suitable for the temperature conditions in the machine.

20. A lubrication guide comprising a temperature responsive member adapted to disclose fluctuations in temperature in a machine and to disclose a maximum temperature in the machine, a scale provided with series of indicia representing respectively types of lubricants, oil drain periods and types of engine fuels, said enabling means being adapted to cooperate with said scale for identifying respectively the type of lubricant, oil drain period, and type of engine fuel suitable for use under machine operating conditions whereby said temperature fluctuations and maximum temperature were developed in the machine.

21. In a lubrication guide, a scale provided with indicia representing types of lubricants suitable for various operating temperatures in a machine, and means cooperating with said scale for disclosing the operating temperatures.

22. In a lubrication guide, in combination with means for disclosing working temperatures of a lubricant in a machine due to operating conditions of the machine, a scale adapted to cooperate with said means provided with indicia representing types of lubricants respectively suitable for use under the operating conditions whereby the working temperatures of the lubricant are developed.

23. In combination with a scale provided with indicia representing ranges of average temperatures of heat-affected parts of a machine for efficient service of various lubricants in the machine, and indicia designating lubricants suitable for use in said temperature ranges, means responsive to temperatures in the machine adapted to indicate the range of temperature suitable for the lubricant in the machine.

24. In combination with means responsive to temperatures of a plurality of parts in a machine, a scale provided with a plurality of groups of indicia representing respectively selected lubricants and the several suitable ranges of temperature of said parts for efficient service of the lubricants in the machine.

25. In combination with a machine adapted to be provided with a lubricant suited to the operating conditions of the machine, a lubrication guide comprising a heat responsive member adapted to disclose the temperature of a selected area in the machine under various operating conditions, and a scale having a plurality of indicia representing respectively the lubricants suited to the several operating conditions disclosed by the heat responsive member.

26. In combination with an engine and means for circulating a lubricant over heat-affected parts of the engine, a device of the character described for disclosing the types of lubricant suitable for different engine operating conditions, comprising a temperature responsive member adapted to disclose the average of the temperatures of said heat-affected parts of the engine and a scale provided with a plurality of indicia representing respectively the types of lubricants suitable for efficient service in the engine under the operating conditions disclosed by the temperature responsive means.

27. In combination with a temperature responsive member and a machine supplied with a lubricant adapted to lubricate the machine efficiently under a predetermined temperature condition, a lubrication guide including a scale provided with indicia designating types of lubricants suitable for use in the machine under various temperature conditions, and means enabling the temperature responsive member to indicate the lubricant suitable for use in the machine under the actual temperature conditions.

28. The method of disclosing lubrication requirements of a machine, comprising arranging an indicator to receive effects of changes in the working temperature of a lubricant in the machine due to changes in operating conditions of the machine, and disclosing the types of lubricant suitable for use in the machine under the operating conditions whereby the changed working temperature of the lubricant was developed.

29. The method of disclosing lubricant requirements of a machine under different operating conditions, comprising arranging an indicator to indicate the working conditions of the lubricant in the machine due to operating temperatures of the machine, arranging a scale in association with said indicator, ascertaining the characters of lubricants which would best meet the machine operating temperatures under which the working conditions of the lubricant are developed, and designating elements of the scale to represent said lubricants.

30. The method of disclosing lubricant requirements of a machine comprising initially selecting a lubricant suitable for the normal operation of the machine, designating lubricants for abnormal operation of the machine, designating the normal temperature of the selected lubricant under said normal operating conditions, indicating the actual temperatures produced by operation of the machine, and indicating the lubricant suitable for use under said indicated actual operating conditions.

31. The method of disclosing lubricant requirements of a machine comprising designating lubricants suitable for various operating conditions in the machine, designating the normal temperatures of the lubricants under said several operating conditions, indicating the actual temperatures produced by operation of the machine, and indicating the lubricant suitable for use under said indicated actual operating conditions.

32. The method of disclosing lubricant requirements of a machine under different operating conditions comprising arranging a temperature indicator to indicate fluctuations in temperature adjacent a part of the machine, arranging a scale in association with said indicator, designating one element on the scale to represent normal lubrication requirements, ascertaining the body and character of lubricants which would best meet the different lubrication requirements, and designating other elements on the scale to indicate the body and character of lubricants which will best satisfy the lubrication requirements of the machine when the indications of the indicator warn that the machine is operating abnormally.

33. The method of disclosing lubricant requirements of a machine under different operating conditions comprising arranging a temperature indicator to indicate fluctuations in temperature adjacent a part of the machine, arranging a scale in association with said indicator, ascertaining the body and character of lubricants which would best meet the different lubrication requirements of the machine, designating one element of the scale to represent the lubricant adapted to meet the normal lubrication requirement, and designating another element on the scale to indicate a lubricant which will best satisfy another lubrication requirement of the machine.

In testimony whereof I affix my signature.

CARL E. HOLT.